July 24, 1951  D. G. MAGILL ET AL  2,561,391
FROZEN FOOD CONTAINER
Filed Feb. 12, 1946  2 Sheets-Sheet 1
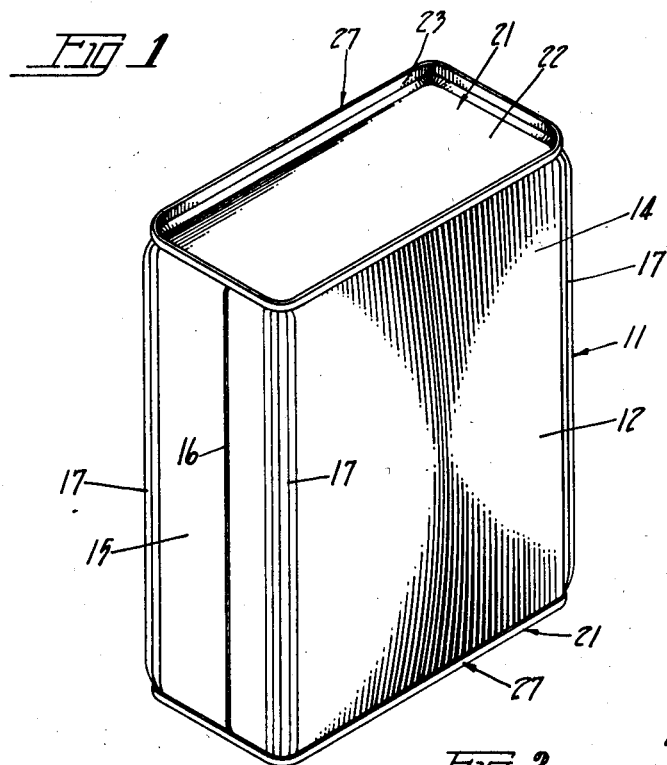
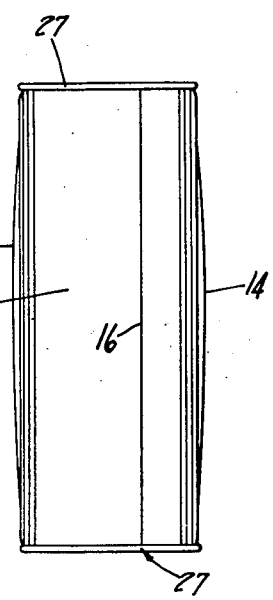
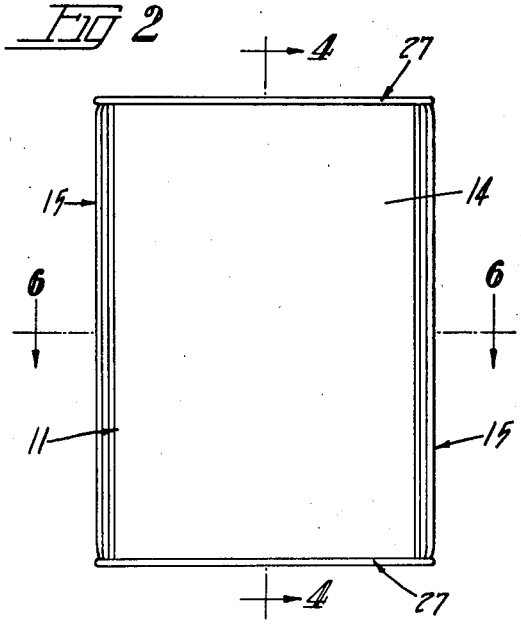
INVENTORS
Donald G. Magill
BY Richard P. Bigger
Ivan D. Thornburgh
Charles H. Erne
ATTORNEYS July 24, 1951  D. G. MAGILL ET AL  2,561,391
FROZEN FOOD CONTAINER
Filed Feb. 12, 1946  2 Sheets-Sheet 2
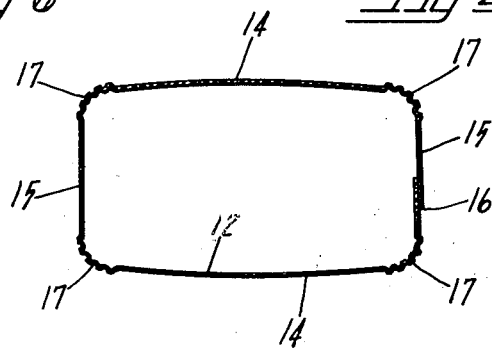
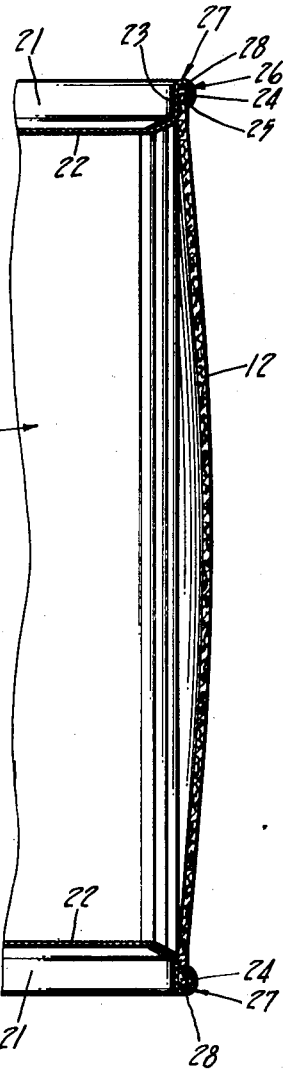
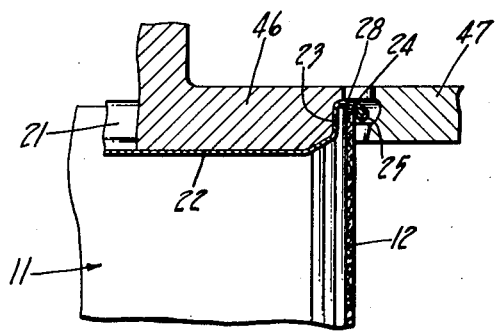
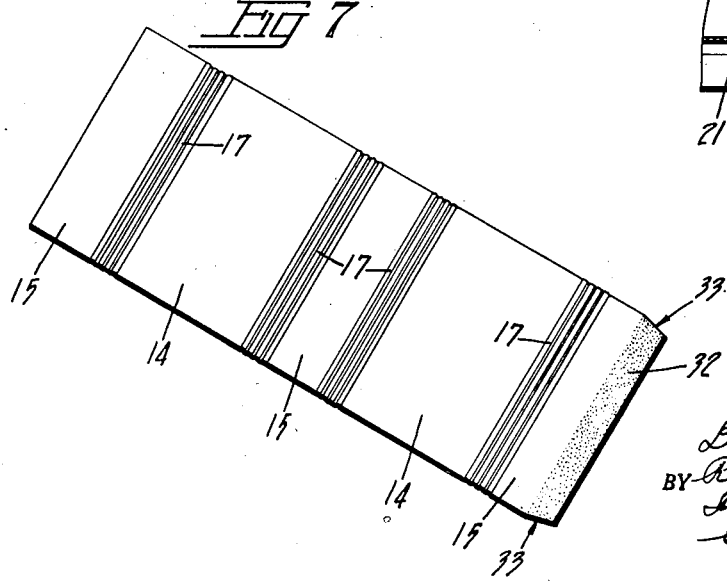
INVENTORS
Donald G. Magill
BY Richard P. Bigger
Ivan D. Thornburgh
Charles H. Erne
ATTORNEYS Patented July 24, 1951

2,561,391

UNITED STATES PATENT OFFICE 2,561,391

FROZEN FOOD CONTAINER

Donald G. Magill, Great Neck, and Richard P. Bigger, Babylon, N. Y., assignors to American Can Company, New York, N. Y., a corporation of New Jersey Application February 12, 1946, Serial No. 647,132

1 Claim. (Cl. 229—5.5)

The present invention relates to containers for frozen food products and a method of producing the same and has particular reference to a semi-rigid form of container which facilitates the freezing of the product in the container and which provides a unitary package which can be automatically filled and sealed and utilized for marketing and satisfactorily protecting the product.

In some methods of quick freezing food products in containers an essential step of the method is intimate contact of the container walls with portions of the freezing apparatus so that absorption of the heat from the product may be rapidly effected. This transfer of heat must be effected through the walls of the container and through any other intervening walls or layers such as inner liners, outer wrappers, labels, etc. For best results it has been found that more rapid and more efficient freezing can be obtained when these intervening walls are reduced to a minimum as regards thickness or number of layers consistent with adequate product protection and are arranged for firm contact with the freezing apparatus.

The instant invention contemplate overcoming the difficulties and disadvantages of prior containers by the provision of a container of semi-rigid construction in which liners and wrappers are eliminated so that only a single flexible wall intervenes between the food product to be frozen and the freezing apparatus.

An object of the invention is the provision of a container for frozen foods and a method of producing the same wherein the container is a complete unitary package, without the use of inner liners or bags or outer wrappers or labels, and which may be printed at the place of manufacture and which eliminates the usual setting up or assembly of a number of separate parts prior to filling and sealing.

Another object is the provision of such a container and method of producing the same wherein the container is formed with flexible side walls adapted to yield under pressure of the freezing apparatus to insure firm contact with said apparatus during the freezing operation for the rapid and efficient transfer of heat through the wall of the container to effect complete and rapid freezing of the enclosed product.

Another object is the provision of such a container and method of producing the same wherein the container is of a semi-rigid construction of fibre body and metal end members and which may be readily opened by simply cutting through the body adjacent an end member or a mere prying off of one of the end members.

A further object is the provision of such a container which is liquid-tight so that products packed with syrups, sauces and other liquids may be thawed in the container without leakage.

Another object is the provision of such a container which is extremely resistant to the transfer of moisture vapor through its walls so that the frozen product is protected against dehydration during storage.

Still another object is the provision of such a container which is of simple and economical construction, which will withstand rough handling and which is adapted to high speed automatic filling and sealing.

Numerous other objects and advatnages of the invention will be apparent as it is better understood from the following description, which, taken in connection with the accompanying drawings, discloses a preferred embodiment thereof.

Referring to the drawings:

Figure 1 is a perspective view of a container embodying the instant invention and made in accordance with the method steps of the instant invention;

Fig. 2 is a side elevation of the container shown in Fig. 1;

Fig. 3 is an end elevation of the container;

Fig. 4 is an enlarged sectional view of the container taken substantially along the line 4—4 in Fig. 2, with parts broken away;

Fig. 5 is an enlarged sectional view of one corner of the container showing how the end members of the container are secured in place, the view also showing principal parts in section of an apparatus for performing this closing operation;

Fig. 6 is a transverse section taken substantially along the line 6—6 in Fig. 2; and Fig. 7 is a perspective view of a flat blank from which the container body is made.

As a preferred embodiment of the invention the drawings illustrate a rectangular shaped, semi-rigid container 11 for frozen food products. Such a container includes a tubular fibre body 12 of rectangular cross section having broad or wide side walls 14 and comparatively narrow end walls 15, the end walls being approximately one-half the width of the side walls. A lap type side seam 16 is disposed in one of the end walls 15. The corners of the body are rounded and are preferably reinforced by a plurality of closely spaced and parallel vertically disposed corrugations, beads or scores 17. These corrugations, beads or scores provide a corner radius and facilitate the assembly of the end members to the container body. They also provide a means for taking up or absorbing the excess material produced by the flattening of the bulged side walls, especially during the plate type freezing operation.

All surfaces of the body including its edges preferably are impregnated with and/or carry a surface coating or film of a suitable liquid and moisture vapor proofing substance to protect the frozen product contents of the container against leakage and dehydration. In some cases either the inner or outer surface only of the body may carry a film or layer of the coating substance.

Suitable coating materials for this type of container are for example: hydrocarbon waxes of mineral origin, or wax-like materials of vegetable or animal origin, with or without suitable modifiers; natural or synthetic resins with or without suitable modifiers, and/or natural or synthetic rubber derivatives with or without suitable modifiers; or any combination of the foregoing.

The open ends of the fibre body 12 are closed with rectangular shaped metal top and bottom end members 21. These end members are formed with a countersunk panel wall 22 which merges into a surrounding upright friction wall section 23. The friction wall section initially fits loosely within the end of the body and engages against the inner surface thereof when the end member is finally secured to the body. Adjacent the outer edge of the body the friction wall section 23 extends outwardly over the edge, providing a gasket receiving channel and terminates in a flange 24 which extends down against the outside of the body and is crimped tightly in place.

The terminal edge of the flange 24 is formed with an edge curl or hem 25 which is imbedded or pressed into the outer surface of the fibre body walls. Thus the upright friction wall section 23 and the crimped flange 24 set off a peripheral channel 26 which seals the outer coated edges of the body and provides an end seam 27 which is liquid tight and substantially moisture vapor proof. Where the inner surfaces only of the body are liquid and substantially moisture vapor proofed a lining compound 28 may be used in the channel 26 to seal the edges of the body. Or this lining compound 28 may be used as an additional sealing medium even in cases where all parts of the fibre body have first been liquid-proofed and substantially moisture vapor proofed.

The width of the end members 21 is preferably slightly smaller than the width of the inside of the body 12. With such an end member secured to the body the outer periphery of the end seams 27, along the narrow end walls 15 of the body is substantially flush with the body end walls as best shown in Fig. 2. These end walls are straight from top to bottom. Along the wider side walls 14, the end members draw the body wall inwardly at the seams and thus impart a curved or bellied effect to these side walls in two directions, i. e., along the width and height of the walls, as best shown in Figs. 3 and 4. The end seams along these walls are therefore set back, inwardly of the body walls. It is this curved effect in the walls that renders them yieldable and flexible to insure firm contact of the major part of the surface of the side walls with the freezing apparatus during the freezing of the product enclosed in the container and also effectively insures intimate contact between juxtaposed container walls.

As an alternative manner of securing the end members 21 to the ends of the fibre body both the width and length of the end members may be made slightly shorter than the corresponding dimensions of the body, thereby obtaining a curved or bellied effect on both the wide side walls 14 and the narrow end walls 15 of the body.

To open the container it is merely necessary to pry off one of the end members 21. Any suitable hook nosed tool may be utilized for this purpose. Or, if desired, the fibre body adjacent one of the end members may be readily cut through with a knife to remove the end member. In either case, a full open mouth is provided by the removal of the end member. By means of this full open mouth the frozen contents may be easily removed as a unit if desired. Also, since the container is liquid proof and free of any inner liners and outer wrappers the frozen product may be readily thawed out in the container before opening.

In accordance with the method steps of producing such a semi-rigid container for frozen food products, the fibre body 12 is first provided. This body preferably is made from a single flat blank (Fig. 7) of suitable paper board.

Examples of such suitable paper board are sulphate or sulphite boards, or combinations of these with ground wood pulp.

In order to provide a container which is completely sanitary it is preferred to make the paper board from all-virgin pulp, both the pulp and the board being produced under bacteriologically controlled conditions.

Along one transverse edge the inner face of the blank is coated with an adhesive 32. The corners of the blank adjacent this edge are preferably formed with tapered notches 33 for the side seams. At spaced intervals along the blank, the reenforcing beads or corrugations 17 are formed therein extending transversely thereof and setting off the side and end walls 14, 15 for the body and reenforcing the rounded corners of the finished body. Such a blank is preferably folded over a mandrel, horn or other forming device and its transverse terminal edges brought together in overlapping relation and secured together under pressure by the adhesive 32 to provide the body 12 having the side seam 16.

The formed body 12 may then be immersed in a bath of one of the coating materials hereinbefore mentioned. This immersion of the body impregnates it with the coating material and supplies a surface film of the coating material on all surfaces including its edges. In some cases where it is desirable to keep the outer surface free of the coating substance, the inner surfaces only may be sprayed with the coating substance to liquid proof and substantially moisture vapor proof the body. In other cases, it may be desirable to coat either the inner, or outer, or both surfaces of the material from which the body is made while the material is in the flat, or these surfaces may be coated by spraying or otherwise while still on the body making machine. After draining and/or drying the body is ready to receive its end members 21.

The bottom end member 21 is first secured to the body 12. The resulting container is then filled with the product to be frozen or which may be pre-frozen, preferably without the use of any liner sheets or bags. This filling of the container may be effected automatically at high speed in the usual filling machines used for such purposes. After this filling operation the top end member 21 is secured in place on the filled container. This seals the container and renders it ready for introduction into the freezing apparatus for the freezing of the enclosed product.

In one form of a typical freezing apparatus the sealed containers are placed between plates in which a refrigerant is circulated. These plates are pressed against the side walls of the containers with a hydraulic ram to insure rapid and efficient transfer of heat from the product within the containers to effect the freezing of the product. It is for this purpose that at least the side walls 14 of the container are bellied outwardly in two directions so that flexure of the freezing plates with the side walls and a resulting firm contact of the major portion of the wall surface of these fibre side walls outwardly from the rigid metal edges of the opposite end seams 27, will be insured when the plates are pressed against the containers.

This bellying of the container side walls 14 is brought about by the application of the end members 21 to the ends of the body 12. For this purpose the width of the bodies is made slightly larger than the width of the end members to be secured to them as hereinbefore mentioned. Preferably the length of the end members is substantially the same as the length of the inside cross sectional dimension of the body.

Thus when an end member is placed upon the end of the body it will snugly engage the inside of the narrow end walls of the body and loosely engage the wider side walls as shown in Fig. 5. With the body is this position a chuck 46 is inserted in the countersunk panel of the end member to back up its friction wall 23. The flange 24 is then forced inwardly against the outer surface of the body. As the flange 24 is bent into place it carries the marginal edge portion of the body along the side walls 14 inwardly with it and clamps it tightly against the backed-up friction wall 23 of the end member in the clinched or crimped end seam 27. This bending action preferably is performed by a set of squeezer jaws 47 which surround the end of the can being operated upon and which together with the chuck 46 may form parts of a more elaborate machine conventionally used for this purpose.

This bending of the flange 24 into seam forming position bellies out the side walls 14 in a gradually curved section extending from one end member to the other. Transversely of the side walls the bellying action bends the side walls outwardly in a gradually curved section extending from one reenforced corner to the other. Thus the entire outer wall surface of the two side walls 14 is formed as a flexible and yieldable convex or slightly dome-shaped structure which provides firm contact of the entire wall surface of these side walls with the freezing apparatus during the freezing operation.

During the end closing operation, the narrow end walls 15 of the body resist any bellying of these walls and thus remain straight. This is brought about by the snug fit of the end members between the end walls when the end seams 27 are formed. The seams are thus flush with the outer surfaces of these narrow end walls.

As previously pointed out, in some desired cases, both the width and the length of the end members may be made slightly shorter than the corresponding dimensions of the body. This does not interfere with the crimping operation and merely results in both side walls and end walls being curved or bowed.

While fibre stock for the container body and metal stock for the container ends have preferably been mentioned herein, it is of course understood that the scope of the invention includes other suitable materials. For example, the whole container may be made entirely of metal or entirely of fibre or a combination of suitable materials may be used in its construction.

It is thought that the invention and many of its attendant advantages will be understood from the foregoing description, and it will be apparent that various changes may be made in the form, construction and arrangement of the parts and that changes may be made in the steps of the process described and their order of accomplishment without departing from the spirit and scope of the invention or sacrificing all of its material advantages, the form hereinbefore described being merely a preferred embodiment thereof.

We claim:

A semi-rigid container for frozen foods, comprising a tubular flexible body of rectangular cross section having substantially smooth side and end walls set off by rounded corners, said end walls being substantially flat throughout their extent, and a countersunk metal end member secured to each end of said body in an end seam, the intermediate portions of the opposed side walls of said tubular body being spaced apart a distance greater than the width of a said end member so that said side walls project laterally outwardly beyond the adjacent peripheral portions of said secured metal end members in yieldable arcuate bulges, the bulge in each of said side walls extending in a longitudinal direction from one of said end seams to the other and in a transverse direction from one of said rounded corners to the opposite rounded corner for insuring firm contact and compression of said bulged walls with adjacent portions of an apparatus for freezing a food product disposed in said container, said outwardly bulged opposed side walls also providing an intermediate cross-sectional container body dimension of a materially greater area than the corresponding overall dimension of a said end member.

DONALD G. MAGILL.
RICHARD P. BIGGER.

REFERENCES CITED

The following references are of record in the file of this patent:

UNITED STATES PATENTS

| Number | Name | Date |
|---|---|---|
| 654,255 | Hunter | July 24, 1900 |
| 1,992,182 | Buist | Feb. 26, 1935 |
| 2,218,388 | Twombly | Oct. 15, 1940 |
| 2,251,808 | Rutkowski | Aug. 5, 1941 |
| 2,306,255 | Scott | Dec. 22, 1942 |
| 2,311,675 | Magill | Feb. 23, 1943 |
| 2,370,018 | Di Cosmo | Feb. 20, 1945 |
| 2,409,460 | Waters | Oct. 15, 1946 |
| 2,425,708 | Wilcox | Aug. 12, 1947 |

FOREIGN PATENTS

| Number | Country | Date |
|---|---|---|
| 67,486 | Norway | Feb. 28, 1944 |